March 21 1944.　　　E. A. RYDER　　　2,344,924

METHOD AND APPARATUS FOR CROWNING PISTON RINGS

Filed Oct. 17, 1942

INVENTOR
Earle A. Ryder
BY
Harris G. Luther
ATTORNEY.

Patented Mar. 21, 1944

2,344,924

UNITED STATES PATENT OFFICE 2,344,924

METHOD AND APPARATUS FOR CROWNING PISTON RINGS

Earle A. Ryder, West Hartford, Conn., assignor to United Aircraft Corporation, East Hartford, Conn., a corporation of Delaware Application October 17, 1942, Serial No. 462,396

6 Claims. (Cl. 51—157)

An object of this invention is to provide a method and apparatus for lapping piston rings so as to produce a crowned cylinder bearing surface thereon.

Other objects and advantages will be apparent from the specification and claims, and from the accompanying drawing which illustrates what is now considered to be a preferred embodiment of the invention.

Figure 2:
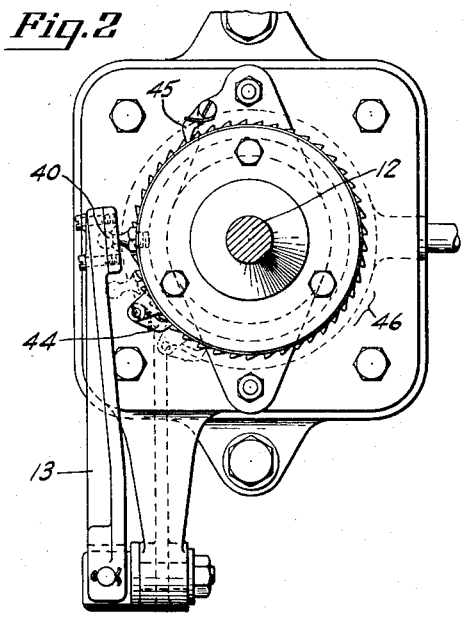
Fig. 2 is a view taken along the line 2—2 of Fig. 1.

Referring to the drawing in detail, piston rings 10, which are to be provided with a crowned, or convex, surface, are reciprocated in cylinder 12 by carrier 14. As the carrier is reciprocated it is intermittently rotated in one direction. Because rings 10 are free in the ring grooves of the carrier there will be relative rotation between the carrier and the rings, but the rings will be caused by friction to progress around the cylinder axis at a rate slower than the rate of rotation of the carrier. The carrier is positioned at an angle other than a right angle with respect to the axis of the cylinder, or the ring grooves are so formed that the plane of each is at an angle other than a right angle to the axis of the cylinder. Thus, the bearing face of each ring will not lie parallel to the internal surface of the cylinder wall except at two diametrically opposite positions, but will be oblique thereto. As the carrier rotates, with respect to both the cylinder and the rings, this angle of obliquity varies for any portion of the ring bearing surface, from a maximum through zero and then to a maximum on the other side of the parallel, or zero angle, position. As the rings rotate more slowly than the carrier, each surface portion thereon will contact each portion on the internal surface of the cylinder within the path of movement of the carrier. Thus, the rings will be lapped to the cylinder and at the same time crowned by the wearing action of the cylinder wall on the edges of the rings.

Figure 1:
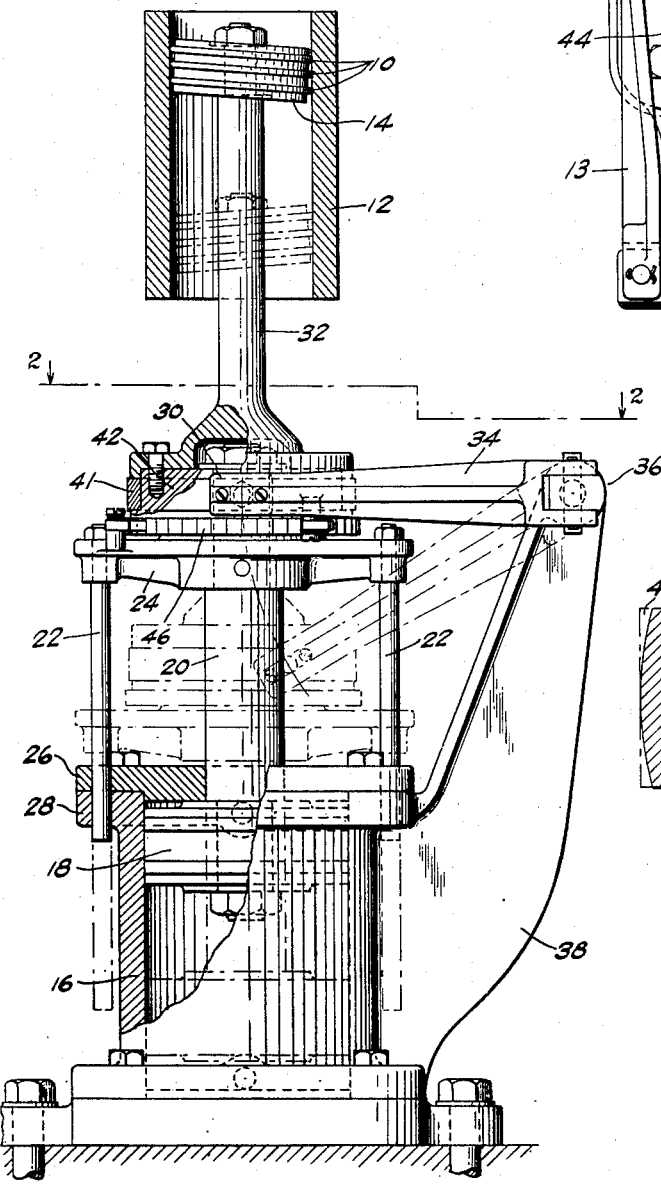
Fig. 1 is a front view, partly in section, of a preferred apparatus.

In order to reciprocate and rotate the ring carrier the following mechanism is provided. A cylinder 16 contains a piston 18, which is reciprocated by a pressure fluid through valve mechanism (not shown) in a manner well known in the art. Piston 18 is attached rigidly to piston rod 20, which is guided for reciprocating movement by a cross-head 24 attached to the end of the piston rod, and guided by vertical rods 22 sliding in holes in cylinder head 26 and cylinder flange 28. Piston rod 20 extends through the crosshead and on the upper side thereof has a swiveled connection 30, with connecting rod 32 of the carrier head. This swiveled connection provides for rotation of rod 32 and carrier 14 during reciprocating thereof. To effect such rotation an arm 34 is connected at one end through universal joint 36 with a fixed member 38, and at its other end by a ball and socket joint 40 with ring 41 journaled on plate 42 fixed to rod 32. As rods 20 and 32 are moved downwardly, the end of arm 34 will move in an arc as shown in dotted lines in Fig. 1, and will cause ring 41 to rotate and move plate 42 by means of pawl 44 attached to ring 41 and engaging rachet 46 attached to plate 42. The rod 32, being fixed to plate 42, will move therewith and rotate the carrier 14 in a counter-clockwise direction, as viewed from above. Retrograde movement of the rachet is prevented by detent 45. The lateral component of the movement of the arm 34 through the return arc is provided for by rotation of the ring 41 about the plate 42. Thus, as the piston 18 is reciprocated, carrier 14 will be both reciprocated and intermittently rotated in one direction. This movement is transmitted, with some slip in the rotative direction, to rings 10, which are consequently lapped and crowned as at 48 (Fig. 3) because they occupy different angular relationships with the cylinder wall while they are rotating and reciprocating relative thereto. An abrasive may be used between the piston rings and the cylinder wall.

Figure 3:
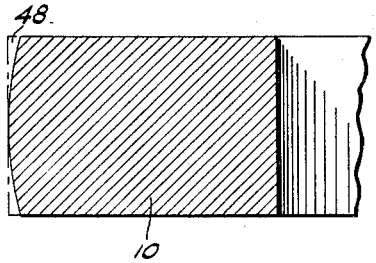
Fig. 3 is a sectional view of a portion of a piston ring, shown as provided with a convex, or crowned, bearing surface by the apparatus of Fig. 1.

Fig. 3 shows to an exaggerated scale a section of a piston ring which has been lapped and crowned by my apparatus and method. I have found that such crowned rings show much less wear and deterioration in use than do rings which have a bearing with the cylinder wall close to one or both of their edges. In fact, I have noted that a "heavy edge" bearing often goes along with ring trouble. My method and apparatus herein described enables me to readily and inexpensively manufacture such an improved ring.

It is to be understood that the invention is not limited to the specific embodiment herein illustrated and described, but may be used in other ways without departure from its spirit as defined by the following claims.

I claim:

1. In a method of uniformly crowning the annular bearing surface of a piston ring the steps of engaging the bearing surface of said ring with an internal cylindrical wearing surface, reciprocating said ring with respect to said surface, and varying the angle between said ring bearing surface and said wearing surface while continuing to reciprocate said ring.

2. In a method of uniformly crowning the annular bearing surface of a piston ring the steps of engaging said ring with an internal cylindrical surface of a wearing member with the plane of the ring at an oblique angle to the axis of said surface, reciprocating said ring with respect to said surface, and rotating said ring in said oblique plane.

3. In a method of uniformly crowning the annular bearing surface of a piston ring the steps of supporting said ring in contact with a cylinder wall with the plane of said ring at an oblique angle to the axis of said wall, and reciprocating said ring with respect to said wall while varying the angle between said plane and said axis.

4. In a method of uniformly crowning the annular bearing surface of piston rings the steps of reciprocating a carrier and rings carried thereby in a cylinder with the rings contacting the cylinder, the plane of each ring being at an oblique angle to the axis of said cylinder, and rotating said carrier relative to said rings about said axis.

5. In apparatus for uniformly crowning the annular bearing surface of a piston ring, a carrier for reciprocating said ring in a cylinder, means for supporting said ring on said carrier with the plane of said ring at an oblique angle to the axis of the cylinder, and means for rotating said carrier with respect to said ring as said ring is reciprocated to uniformly vary the angle between each circumferential portion of the bearing face of said ring and the internal surface of said cylinder between angular limits determined by the angle of obliquity between the plane of said ring and the axis of said cylinder.

6. In apparatus for uniformly crowning the annular bearing surface of piston rings, a carrier for lapping said rings in a cylinder, means for supporting said rings on said carrier with the plane of each ring at an oblique angle to the axis of the cylinder, and means for reciprocating and rotating said carrier with respect to both said rings and said cylinder to uniformly vary the amount of metal worn from said annular ring bearing surface during said lapping operation from a maximum at the upper and lower circumferential edges of said surface to a minimum at the central portion of said surface.

EARLE A. RYDER.